United States Patent
Shanklin et al.

(10) Patent No.: US 6,792,546 B1
(45) Date of Patent: *Sep. 14, 2004

(54) INTRUSION DETECTION SIGNATURE ANALYSIS USING REGULAR EXPRESSIONS AND LOGICAL OPERATORS

(75) Inventors: Steven D. Shanklin, Austin, TX (US); Thomas E. Bernhard, Round Rock, TX (US); Gerald S. Lathem, Elgin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/304,173

(22) Filed: Nov. 25, 2002

Related U.S. Application Data

(63) Continuation of application No. 09/232,385, filed on Jan. 15, 1999, now Pat. No. 6,487,666.

(51) Int. Cl.$^7$ ................................................ G06F 11/30
(52) U.S. Cl. ..................................................... 713/201
(58) Field of Search ................................. 713/163, 176, 713/177, 178, 187, 188, 200, 201; 709/223, 224; 714/38

(56) References Cited

U.S. PATENT DOCUMENTS

| | | | |
|---|---|---|---|
| 5,032,979 A | 7/1991 | Hecht et al. ................. 364/200 |
| 5,101,402 A | 3/1992 | Chiu et al. ..................... 370/17 |
| 5,278,901 A | 1/1994 | Shieh et al. ..................... 380/4 |
| 5,414,833 A | 5/1995 | Hershey et al. .............. 395/575 |
| 5,448,724 A | 9/1995 | Hayashi .................. 395/182.02 |
| 5,488,715 A | 1/1996 | Wainwright ............ 395/182.02 |
| 5,524,238 A | 6/1996 | Miller et al. ................. 395/600 |
| 5,557,742 A | 9/1996 | Smaha et al. ................ 395/186 |
| 5,606,668 A | 2/1997 | Shwed .................. 395/200.11 |
| 5,621,889 A | 4/1997 | Lermuzeaux et al. ........ 395/186 |
| 5,699,513 A | 12/1997 | Feigen et al. ........... 395/187.01 |
| 5,793,763 A | 8/1998 | Mayes et al. ................. 370/389 |
| 5,796,942 A | 8/1998 | Esbensen ................ 395/187.01 |
| 5,798,706 A | 8/1998 | Kraemer et al. ........ 340/825.07 |
| 5,805,801 A | 9/1998 | Holloway et al. ...... 395/187.01 |
| 5,826,014 A | 10/1998 | Coley et al. ............ 395/187.01 |
| 5,919,257 A | 7/1999 | Trostle ......................... 713/200 |
| 5,931,046 A | 8/1999 | Terada et al. ................ 713/201 |
| 5,991,881 A | 11/1999 | Conklin et al. .............. 713/201 |
| 6,016,546 A | 1/2000 | Kephart et al. .............. 713/200 |
| 6,018,735 A | * 1/2000 | Hunter ............................ 707/5 |
| 6,088,804 A | 7/2000 | Hill et al. ..................... 713/201 |
| 6,279,113 B1 | 8/2001 | Vaidya ......................... 713/201 |
| 6,301,668 B1 | 10/2001 | Gleichauf et al. ........... 713/201 |
| 6,321,338 B1 | 11/2001 | Porras et al. ................. 713/201 |
| 6,487,666 B1 | * 11/2002 | Shanklin et al. ............. 713/201 |
| 6,609,205 B1 | * 8/2003 | Bernhard et al. ........... 713/201 |

OTHER PUBLICATIONS

Barrus et al, "A Distributed Autonomous–Agent Network–Intrusion Detection and Response System" Jul. 1998, www.cs.nps.navy.mil/people/faculty/rowe/barrusap.html, p. 1–12.*

(List continued on next page.)

*Primary Examiner*—Ayaz Sheikh
*Assistant Examiner*—Christopher Revak
(74) *Attorney, Agent, or Firm*—Baker Botts L.L.P.

(57) ABSTRACT

A method of describing intrusion signatures, which are used by an intrusion detection system to detect attacks on a local network. The signatures are described using a "high level" syntax having features in common with regular expression and logical expression methodology. These high level signatures may then be compiled, or otherwise analyzed, to provide a process executable by a sensor or other processor-based signature detector.

30 Claims, 1 Drawing Sheet

OTHER PUBLICATIONS

Kumar et al, "A Software Architecture to Support Misuse Intrustion Detection", Mar. 17, 1995, The COAST Project Department of Computer Sciences Purdue University, p. 1–17.*

Lin et al. :Abstraction–Based Misuse Detection: High–Level Specifications and Adaptable Strategies, 1998, Center for Secure Information Systems George Mason University, p. 1–12.*

Fryer et al, "Microsoft Press Computer Dictionary" 1997, Microsoft Press, $3^{rd}$ Edition, p. 182, 183,441.*

Bhattacharyya, "Needed: a net processor language", Electronic Engineering Times, Aug. 28, 2000, p. 1–2.

Shiratsuchi et al., "Studies on Intrusion Detection System Using Modular Neural Networks", dialog search, 2002.

"Efficient Attack Identification", Business Wire, dialog search, Feb. 25, 2002.

"Introduction to Algorithms," by Thomas H. Cormen, Charles E. Leiserson, Ronald L. Rivest, Chap. 34, pp. 853–885, Copyright © 1990.

Stevens, W. Richard, "TCP/IP Illustrated", 1994, Addison Wesley Longman Inc., vol. 1, p. 2, 34, 36.

Preliminary Report on Advanced Security Audit Trail Analysis on UNIX, N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html).

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html).

"GrIDS—A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue/edu/coast//archive/data/categ24.html).

"An Application of Pattern Matching in Intrusion Detection", S. Kumar, et al., pp. 1–55 (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue/edu/coast/archive/data/categ24.html, Mar. 1995.

"Applying Genetic Programming to Intrusion Detection", M. Crosbie, et al., pp. 1–8, (found at http://www.cs.purdue/edu/coast/archive/data/categ24.html).

"Defending a Computer System Using Autonomous Agents", M. Crosbie, et al., pp. 1–11, (found at http://www.cs.purdue.edu/coast/archive/data/categ24.html),, Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html).

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weakness In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16., (found at http://www.cs.purdue.edu/coast/archive/data/categ30.html).

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wietse Venema, 8 pages, (found at http://www.cs.purdue.edu/coast/archive/data/categ30.html).

"Characteristics of Wide–Area TCP/IP Conversations", R. Cáceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Immature Activity in a Networked Environment", L.T. Heberlein et al., *Proc. of the 14th National Computer Security Conference,* Oct. 1991, pp. 362–371., (found at http://seclab.cs.ucdavis.edu/papers.html.), 1991.

"Internetwork Security Monitor: An Intrusion–Detection System for Large–Scale Networks", L.T. Heberlein et al., *Proc. of the 15th National Computer Security Conference,* Oct. 1992, pp. 262–271.

"Comparison Between Internet Security Scanner (ISS) 1.x and Internet Scanner 3.2", Internet Security Systems., (found at http:///www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2,* 1999, pp. 1–47, (found at http://seclab.cs.ucdavis.edu/papers.html.), Jan. 26, 1999.

"Luby–Rackoff Backwards: Increasing Security by Making Block Ciphers Non–Invertible", M. Bellare, et al., *Advances in Cryptology—Eurocrypt 98 Proceedings, Lecture Notes in Computer Science,* vol. 1403 Springer–Verlat (1998) pp. 1–27, (found at http://seclab.cs.ucdavis.edu/papers.html.), May 17, 1998.

"Detecting Disruptive Routers: A Distributed Network Monitoring Approach", K.A. Bradley, et al., *Proceedings of the 1998 IEEE Symposium on Security and Privacy,* Oakland, CA, pp. 115–124 (found at http://seclab.cs.ucdavis.edu/papers.html.), May 1998.

"Stack and Queue Integrity on Hostile Platforms", P.T. Devanbu, et al., *IEEE Symposium on Security and Privacy,* Oakland, CA, (found at http://seclab.cs.ucdavis.edu/papers/html.), 1998.

"Techniques for Trusted Software Engineering", P.T. Devanbu et al., *Proceedings of the 20th International Conference on Software Engineering,* Kyoto, Japan, (found at http://seclab.cs.ucdavis.edu/papers.html.), 1998.

"Data Level Inference Detection in Database Systems", R.W. Yip et al., *Proceedings of the 11th IEEE Computer Security Foundations Workshop,* Rockport, Massachusetts, (found at http://seclab.cs.ucdavis.edu/papers.html.), 1998.

"The Design and Implementation of a Data Level Database Inference Detection System",. Yip et al., *Proceedings of the Twelfth Annual IFIP WG 11.3 Working Conference on Database Security,* Chalkidiki, Greece 14 pages, (found at http://www.seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.), Mar. 13, 1997.

"Information Survivability, Security, and Fault Tolerance", Matt Bishop, position paper for the Information Survivability Workshop *Journal of Computer Security #6*) 1 page, (found at http://seclab.cs.ucdavis.edu/papers.html.), 1997.

"Teaching Computer Security", Matt Bishop, position paper for the *Workshop on Education in Computer Security,* Monterey CA, 3 pages, (found at http://seclab.cs.ucdavis.edu/papers.html.), 1997.

"Protecting Routing Information from Denial of Service Using Cooperative Intrusion Detection", S. Cheung et al., *Proc. new Security Paradigms Workshop,* Cumbria, UK 13 pages, (found at http://seclab.cs.ucdavis.edu/papers.html.), 1997.

"Cryptographic Verfication of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html.), 1997.

"An Efficient Message Authentication Scheme for Link State Routing", S. Cheung, *Proc. 13th annual Computer Security Applications Conference,* San Diego, CA, 9 pages (found at http://seclab.cs.ucdavis.edu/papers.html.), 1997.

"Property–Based Testing; A New Approach to Testing for Assurance", Fink et al., *ACM SIGSOFT Software Engineering Notes,* 22(4), (found at http://seclab.cs.ucdavis.edu/papers.html.), 1997.

"Checking for Race Conditions in File Accesses", Bishop et al., *Computing Systems* 9(2)., (found at http://seclab.cs.ucdavis.edu/papers.html.), 1996.

"An Isolated Network for Research", Bishop et al., *The 19th NISSC,* pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers.html.), 1996.

"Extending The Take–Grant Protection System", J. Frank et al., The IEEE Oakland Conference on Research in Security and Privacy., (found at http://seclab.cs.ucdavis.edu/papers.html.), Dec. 5, 1996.

Network Security Via Reverse Engineering of TCP Code: Vulnerability Analysis and Proposed Solutions, Guha et al., *Proc. of the IEEE Infocom '96,* San Francisco, CA (found at http://seclab.cs.ucdavis.edu/papers.html.), 1996.

"Attack Class: Address Spoofing", Heberlein et al., The 19th National Information Systems Security Conference, (found at http://seclab.cs.ucdavis.edu/papers.html), 1996.

PhD. Thesis entitled Execution Monitoring Of Security— Critical Programs In A Distributed System: A Specification-Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering,* vol. 22, No. 10, (found at http://seclab.cs.ucdavis.edu/papers.html), 1996.

"The Exact Security of Digital Signatures—How to Sign with RSA and Rabin", Bellare et al. Earlier version appears in *Advances in Cryptology—Eurocrypt '96,* LNCS vol. 1070, U. Maurer ed., Springer–Verlag, pp. 399–416), (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html)., 1996.

"GrIDS—A Graph Based Intrusion Detection System For Large Networks", Staniford–Chen et al., *The 19th NISSC*. 10 pages, (found at http://seclab.cs.ucdavis.edu/papers.html), 1996.

"NetKuang—A Multi–Host Configuration Vulnerability Checker", Zerkle et al., *Proc. of the 6th USENIX Security Symposium*, San Jose, CA., (found at http://seclab.cs.ucdavis.edu/papers.html), 1996.

"A Standard Audit Trail Format", Matt Bishop, *Proc. of the 1995 NISSC*, Baltimore, MD., (found at http://seclab.cs.ucdavis.edu/papers.html)., 1995.

Abstract entitled Theft of Information in the Take–Grant Protection Model, Matt Bishop, *Journal of Computer Security*, vol. 3, No. 4, (found at http://seclab.cs.ucdavis.edu/papers.html), 1995.

"Improving System Security via Proactive Password Checking", Matt Bishop, *Computers & Security*, vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC*, Baltimore, MD, 11 pages, (found at http://seclab.cs.ucdavis.edu/papers.html), 1995.

"Network Security Monitor", L. Todd Heberlein, *Lawrence Livermore National Laboratory project deliverable*, (found at http://seclab.cs.ucdavis,edu/papers.html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers.html), 1995.

"MCF: A Malicious Code Filter", R.W. Lo et al., *Computers & Security*, (1995) vol. 14, No. 6. (27 pages.), (found at http://seclab.cs.ucdavis.edu/papers.html), 1995.

"Bucket Hashing and its Application to Fast Message Authentication", Phillip Rogaway, *Acvances in Cryptology—CRYPTO '95*, (found at http://seclab.cs.ucdavis.edu/papers.html), 1995.

"Provably Secure Session Key Distribution—The Three Party Case", Bellare et al., *Proc. of the 27th Annual ACM Symposium on Theory of Computing*, Las Vegas, NV, (found at http://seclab.cs.ucdavis.edu/papers.html), 1995.

"XOR MACs: New Methods for Message Authentication Using Finite Pseudorandom Functions", Bellare et al., *Advances in Cryptology—CRYPTO '95*, (found at http://seclab.cs.ucdavis.edu/papers.html), Oct. 1995.

"Holding Intruders Accountable on the Internet", Staniford–Chen et al., *Proc. of the 1995 IEEE Symposium on Security and Privacy*, Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference*, 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium*. 10 pages (found at http://seclab.cs.ucdavis.edu/papers.html), Dec. 1994.

"Artificial Intelligence and Intrusion Detection: Current and Future Directions", Jeremy Frank, *Proc. of the 17th National Computer Security Conference*. 12 pages, (found at http://seclab.cs.ucdavis.edu/papers.html), 1994.

"Automated Detection of Vulnerabilities in Privileged Programs by Execution Monitoring", Ko et al., *Proc. of the 10th Annual Computer Security Applications Conference*, Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers.html), 1994.

"Network Intrustion Detection", Mukherjee et al., *IEEE Network*, May–Jun. 1994, vol. 8, No. 3, pp. 26–41. (found at http://seclab.cs.ucdavis.edu/papers.html).

"A New Suggestion for How to Encrypt with RSA", Bellare et al., *Eurocrypt '94*, 20 pages, (found at http://sclab.cs.ucdavis.edu/papers.html), 1994.

"The Security of Cipher Block Chaining", Bellare et al., *Advances in Cryptology—CRYPTO '94*, Santa Barbara, CA. (19 pages.) (found at http://seclab.cs.ucdavis.edu/papers.html), 1994.

"Analysis Of An Algorithm For Distributed Recognition And Accountability", Ko et al., *Proc. 1st ACM Conference on Computer and Communication Security*, Fairfax, VA, Nov. 1993, 11 pages, (found at http://seclab.cs.ucdavis.edu/papers.html).

"Entity Authentication and Key Distribution", Bellare et al., *Advances In Cryptology—CRYPTO '93*, Santa Barbara, CA, Aug. 1993, pp. 232–249. (found at http://seclab.cs.ucdavis.edu/papers.html).

"Random Oracles are Practical: A Paradigm for Designing Efficient Protocols", Bellare et al., *Proc. of the 1st ACM Conference on Computer and Communications Security*, Fairfax, VA, Nov. 1993, pp. 1545–164. (found at http://seclab.cs.ucdavis.edu/papers/html).

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)—Motivation, Architecture, and An Early Prototype, Snapp et al., *Proc. 14th National Computer Security Conference*, Washington, DC (9 pages.) (found at http://seclab.cs.ucdavis.edu/papers.html), 1991.

"Proactive Password Checking", Matt Bishop, *Proc. of the 7th International Conference on Information Security*, May 1991, pp. 169–181. (found at http://seclab.cs.ucdavis.edu/papers.html).

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience*, vol. 20, No. 5, May 1990. (found at http://seclab.cs.ucdavis.edu/papers.html).

Abstract entitled "An Extendable Password Checker" by M. Bishop, *Proc. UNIX Security II* Portland, OR, Aug. 27–28, 1990, pp. 15–16, (found at http://seclab.cs.ucdavis.edu/papers.html).

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy,* Oakland, CA, May 7–9, 1990, pp. 86–94, (found at http://seclab.cs.ucdavis.edu/papers.html).

Abstract entitled "A Network Security Monitor" by L.T., Heberlein, G.V. Dias, K.N. Levitt, B. Mukherjee, and others, *Proc. of the 1990 IEE Symposium on Research in Security and Privacy,* Oakland, CA, May 7–9, 1990, pp. 296–304, (found at http://seclab.cs.ucdavis.edu/papers.html).

Abstract entitled "Static Analysis Virus Detection Tools for UNIX Systems" by P. Kerchen, et al., *Proc. 13th National Computer Security Conference,* Washington, DC, Oct. 1–4, 1990, pp. 350–365, (found at http://seclab.cs.ucdavis.edu/papers.html).

Abstract entitled "Security with Low Communication Overhead" by D. Beaver, et al., *Proc. Advances in Cryptology—CRYPTO '90,* Santa Barbara, CA, Aug. 11–15, 1990, pp. 62–76, (found at http://seclab.cs.ucdavis.edu/papers.html).

Abstract entitled "The Round Complexity of Secure Protocols" by D. Beaver, et al., *Proc. of the 22nd Annual ACM Symposium on Theory of Computing,* Baltimore, MD, May 14–16, 1990, pp. 503–513. (found at http://seclab.cs.ucdavis.edu/papers.html).

Abstract entitled "PACLs: An Access Control List Approach to Anti–Viral Security" by D.R. Wichers, et al., *Proc. 13th National Computer Security Conference,* Washington, DC, Oct. 1–4, 1990, pp. 340–349, (found at http://seclab.cs.ucdavis.edu/papers.html).

Abstract entitled "Verification of Secure Distributed Systems in Higher Order Logic: A Modular Approach Using Generic Components" by J. Alves–Foss, K. Levitt, *Proc. of the 1991 IEEE Computer Science Symposium on Research in Security and Privacy,* Oakland, CA May 20–22, 1991, pp. 122–135. (found at http://seclab.cs.ucdavis.edu/papers/html.

Abstract entitled "An Authentication Mechanism for USENET" by M. Bishop, *Proc. of the Winter 1991 USENIX Conference.* Jan. 21–25, 1991, pp. 281–287, (found at http://seclab.cs.ucdavis.edu/papers.html).

Abstract entitled "Password Management" by M. Bishop, *COMPCON Spring '91, Digest of Papers.* San Francisco, CA, Feb. 25–Mar. 1, 1991, pp. 167–169. (found at http://seclab.ucdavis.edu/papers.html).

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience,* vol. 4, No. 1, Mar. 1993, pp. 47–59. (found at http://seclab.cs.ucdavis.edu/papers.html).

Abstract entitled "A Modified Random Perturbation Method for Database Security" by P. Tendick, N. Matloff, *ACM Transactions on Database Systems,* Mar. 1994, vol. 19, No. 1, pp. 47–63, (found at http://seclab.cs.ucdavis.edu/papers.html).

Short presentation entitled "Intrusion Detection for network Infrastructures" by S. Cheung, K.K. Levitt, C. Ko. *The 1995 IEEE Symposium on Security and Privacy,* Oakland, CA, May 1995.

Master Thesis entitled "Paradigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www.cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2.

NetRanger 1.3 User's Guide, Copyright © 1997 by WheelGroup Corporation, NetRanger product first available summer 1996.

"Information Security and Privacy in Network Environments," by U.S. Office of Technology Assessment, OTA–TCT–606 (Washington D.C: US Government Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

* cited by examiner

INTRUSION DETECTION SIGNATURE ANALYSIS USING REGULAR EXPRESSIONS AND LOGICAL OPERATORS

CROSS REFERENCE TO RELATED APPLICATION

This application is a continuation of U.S. application Ser. No. 09/232,385, now U.S. Pat. No. 6,487,666 filed Jan. 15, 1999 by Steven D. Shanklin, Thomas E. Bernhard and Gerald S. Lathem and entitled "Intrusion Detection Signature Analysis Using Regular Expressions and Logical Operators".

TECHNICAL FIELD OF THE INVENTION

This invention relates to computer networks, and more particularly to prevention of unauthorized access to a local network from computers external to the local network.

BACKGROUND OF THE INVENTION

Prevention of unauthorized access by outsiders to a computer network is a part of any network management program. This security problem has been complicated by recent trends in internetworking of a previously isolated private networks with value added networks, public networks (such as the internet), and with the networks of other enterprises.

Firewalls are one approach to preventing unauthorized access. Essentially, a firewall is a control layer inserted between an enterprise's network and the outside. It permits only some traffic to pass through. The firewall is configured by the administrator of the local network based on the enterprise's security policy. For example, the firewall may block traffic of a certain type, traffic from certain addresses, or traffic from all but a predetermined set of addresses.

Techniques used by network intruders for penetrating network system security have evolved in pace with sophisticated methods for detecting the intruders. Detection methods include software solutions, specifically, software intrusion detection systems, which continually monitor network traffic and look for known patterns of attack.

When an intrusion detection system detects inappropriate activity, it generates appropriate alarms and provides other responses while the attack is occurring. For example, the intrusion detection system might report the attack, log the attack, and terminate the misused connection.

One approach to intrusion detection relies on known patterns of unauthorized activity, referred to as "signatures". These signatures are stored, and, in real time, compared to the packet flow incoming to the network. If a match is found, the incoming datastream is assumed to be misused.

Many existing intrusion detection systems are host-based rather than network based. A host-based system resides on a particular host computer and detects only attacks to that host. A network-based system is connected at some point on a local network and detects attacks across the entire local network.

As an example of network-based intrusion detection, one known pattern of unauthorized access is associated with "IP spoofing", whereby an intruder sends messages to a computer with an IP address indicating that the message is from a trusted port. To engage in IP spoofing, the intruder must first use a variety of techniques to find an IP address of a trusted port and must then modify the packet headers so that it appears that the packets are coming from that port. This activity results in a signature that can be detected when matched to a previously stored signature of the same activity.

For signature indicated by a single packet, the detection process can be as simple as matching a binary string of an incoming packet to a stored binary string. However, for composite signatures, the detection process often requires the use of procedural code, involving loops, counts, comparisons and other processing mechanisms. For this reason, it necessary for a skilled programmer to write the signatures.

SUMMARY OF THE INVENTION

One aspect of the invention is a method of describing signatures used for detecting intrusion to a local network. The method combines features of both regular expression methodology and logical expression methodology. A set of regular expression identifiers is used to represent a set of "signature events". A "signature event" may be a packet type, a sequence of packet types, or any one of a number of signature-related events, such as a count or a time period. Logical operators are used to describe relationships between the signature events, such as whether a count exceeds a certain value. For each signature, one or more of these identifiers and operators are combined to provide a regular expression describing that signature.

An advantage of the invention is that it provides an abstraction for describing intrusion signatures. The signatures are written in a descriptive language rather than in procedural computer code. Security technicians who work with local networks need not learn a programming language in order to describe signatures.

DETAILED DESCRIPTION OF THE DRAWINGS

Intrusion Detection System Overview

Figure 1:
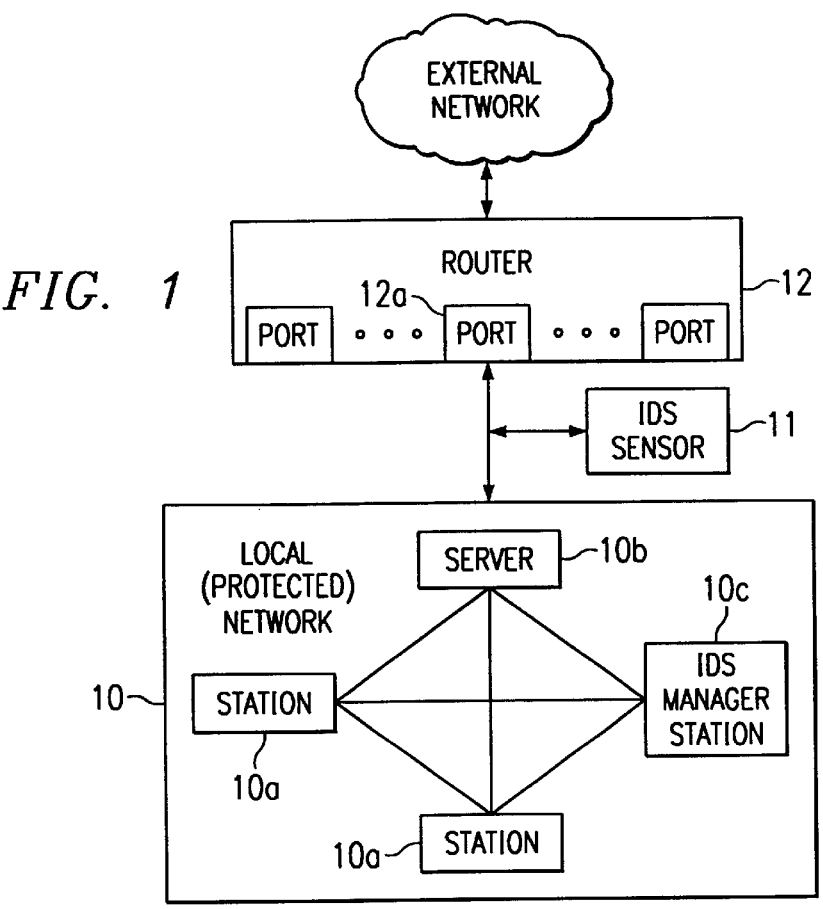
FIG. 1 illustrates a typical intrusion detection systems that analyzes network intrusion signatures.

FIG. 1 illustrates a typical computer network, with a "local network" 10 protected by an intrusion detection system (IDS) sensor 11 in accordance with the invention. The local network 10 is the network being secured, with the rest of the network being referred to herein as the "external network". It is assumed that local network 10 receives and sends data in "packets", which are switched between network segments via router 12.

"Intrusion detection" is a term familiar in the art of network security. As used herein, it includes the various attacks discussed herein, and in general, any type of misuse that can be indicated by a signature.

Router 12 is of a type known in the field of networking, making connections between networks at the transport layer of the OSI model. Router 12 decides whether to forward a packet by examining the packet's protocol level addresses. Router 12 is capable of handling any datalink protocol, thus, ethernet, FDDI, ISDN, and so on are handled in the same manner.

Router 12 inspects packets incoming from the external network to determine which should be forwarded into the local network 10. Similarly, packets originating in the local network are inspected to determine whether they are to be forwarded to the external network. As stated above, router 12 is a type of "internetworking device" in that it is used to connect separate network segments. A characteristic of a router is its ability to communicate with other routers outside the local network 10 to determine the best routes for network traffic.

As explained below, sensor 11 analyzes packets to determine if traffic into and out from local network 10 is misused. Sensor 11 may be implemented as a hardware device or as a combination of hardware and software. Sensor 11 processes a packet by examining its header and payload, as well as its relationship to other packets in the data stream. It detects "signatures" associated with misused access, where a "signature" is an pattern of one or more events represented by strings of binary code.

Although local network 10 is illustrated as having a "mesh" type topology, this is for purposes of example. Local network 10 could be any system of interconnected computer stations 10*a*, typically having a server 10*b* to function as a sort of gateway to network resources.

Local network 10 may include an IDS manager station 10*c*, which provides system management personnel with a user interface and system management functionality especially directed to intrusion detection and response. In this case, sensor 11 might forward alarms to station 10*c*, which may then alert the system manager or automatically take action. Alternatively, sensor 11 may autonomously comprise the entire intrusion detection system. In this case, sensor 11 may have appropriate functionality so that if it detects an intrusion, it can take appropriate action, such as terminating the connection.

An example of a suitable IDS sensor 11 is the sensor device provided with the NETRANGER intrusion detection system, available from Cisco Systems, Inc. The NETRANGER product also includes director management software for use at station 10*c*. A feature of the NETRANGER sensors is their ability to monitor almost any type of IP (internet protocol) network, ranging from internet connections, LAN segments, and the network side of dial-in modems. The data link protocol might be any one of various types, such as ethernet, fast ethernet, token ring, or FDDI. However, other types of intrusion detection sensors (often referred to as "signature processors") could be used and other types of protocols can be analyzed.

In the example of this description, which is in terms network traffic using an IP protocol, the packets incoming to local network 10 may adhere to various protocols running on top of the IP protocol or to IP extensions. For example, the IP protocol may have a TCP or UDP protocol running on top of it. The TCP (transmission control protocol) enables two hosts to establish a connection and exchange streams of data and includes various delivery guarantees. The UDP (user datagram protocol) is used primary for broadcasting messages and provides few error recovery services. The ICMP (internet control message protocol) is an extension to IP and supports packets containing various error, control, and informational messages.

In the example of this description, sensor 11 is capable of examining packets for each of these three IP protocols, i.e., TCP, UDP, and ICMP. In today's networking environments, these IP protocols cover most internet traffic. However, the same concepts could be applied to examination of other protocols, including alternatives to IP.

Sensor 11 captures network data, and parses each packet before signature analysis occurs. Various capabilities of sensor 11 to support signature analysis include, but are not limited to, checksum verification, hop count checking, IP option checking, MTU checking for maximum packet size, IP fragment reassembly, TCP stream reassembly, as well as pattern matching.

The signatures detected by sensor 11 include those associated with malicious intent attacks, denial of service attacks, evasion attempts, and other methods of misuse.

Signature Analysis Overview

Signature analysis uses one or more intrusion detection sensors 11, which are installed on a network segment and are transparent to network performance. For purposes of example, the operation of a typical intrusion detection sensor 11 is described herein. However, it should be understood that the basic concepts of the invention are not limited to a particular type of sensor, and can be applied in the context of any hardware/software configuration that is a misuse signature "sensor" in that it performs signature analysis.

A sensor 11 contains a detection engine, which examines each packet incoming to the sensor 11, including its header and payload. The sensor 11 also analyzes each packet's relationship to adjacent and related packets in the data stream. If the analysis indicates misuse, the sensor may act autonomously to take action, such as disconnection, or it may send an alarm to a separate intrusion detection management station.

The signature detection engine of a sensor 11 uses a signature recognition methodology that includes both context and content oriented signature analysis. Context-oriented signatures consist of known network service vulnerabilities that can be detected by inspecting packet headers. Examples of context-oriented signatures are SATAN, TCP Hijacking, and IP spoofing signatures. Content-oriented signatures require the inspection of data fields within a packet to determine if an intrusion has occurred at the application level. These include e-mail and web attack signatures. A sensor 11 might also have the capability to be programmed to analyze packets for customized signatures for a particular network.

Signatures may also be categorized as being either atomic or composite. Atomic signatures comprise information (context or content) in a single packet. Composite signatures comprise information in multiple packets.

Regular Expressions and Logical Operators for Representing Intrusion Signatures

One aspect of the invention is the use of a signature description language to describe intrusion signatures. As explained below, this language is a combination of regular expression and logical expression methodology.

Regular expression methodology is a basic methodology in the art of computer programming. In general, they are used for defining a syntactical structure that can be readily compiled or otherwise analyzed. More specifically, regular expressions are sequences of letters or numbers (ordinary characters), in combination with special operators, which together specify strings. Essentially, a given regular expression provides a shorthand descriptive representation for a string.

An ordinary character is a simple regular expression that matches that same character and nothing else. The following table sets out an example of special characters (symbols) that can be used to form regular expressions. These are consistent with those used in the regular expression syntax associated with the UNIX operating system.

| symbol | definition |
|--------|------------|
| [xyz]  | character class |
| x\|y   | or |
| x*     | zero or more x's |
| x+     | one or more x's |
| x?     | zero or one x |

As examples, AB denotes the set of strings {AB}, the set having just one member. The expression A|B denotes A or B. The expression A*B denotes zero or more A's followed by B. It should be understood that other symbols could be substituted to perform the same type of matching. Another set of examples of regular expression symbols are those associated with the PERL programming language.

As indicated by the above table, regular expression symbols include operators that allow concatenation (such as by adjacent identifiers), alternation (such as by identifiers separated with |), and repetition (such as an identifier followed by *). Precedence is determined by a predefined convention (such as by * highest, then concatenation, then alternation), with deviation permitted by use of a special symbol (such as parentheses).

As applied to signature detection analysis, each type of packet associated with a signature can be described with a unique identifier. A regular expression having identifiers of this type is referred to herein as a "packet-based" regular expression. A packet-based regular expression might have the following form:

"C.*CC [~C]C where C is a defined packet type. Thus, instead of C representing a character as is the case with conventional regular expressions, C represents a packet type.

Regular expressions can be used to describe signatures involving sequences of different packet types. Thus, for example, three different packet types might be defined with the identifiers A, B, and C. An example of a regular expression for a particular sequence of these three packet types is:

A.*BB.*C

For a given stream of packets, any sequence of packet type A, followed by 0 or more packets of any type, followed by two packets of type B, followed by 0 or more packets of any type, followed by a packet of type C, will result in a match.

The use of regular expressions can be extended so that each identifier represents an "event", which could be a single packet, a sequence of packets, or a signature-related event. A signature-related event could be, or could include, a time period, a count, a packet in the opposing direction, or any other conceivable event that could be part of a signature. This type of regular expression is referred to herein as an "event-based" regular expression.

Because signatures often comprise events as well as packets types, the use of regular expression methodology can be combined with logical expression (Boolean) methodology to more completely describe signatures. Logical expressions involve the use of operators that relate parts of an expression so that the outcome is true or false. Logical operators include AND, OR, NOT, and greater than, less than, or equal to.

An example of a signature is a TCP SYN flooding signature, which represents the events associated with a SYN flooding attack. In a SYN flooding attack, an attacker transmits a volume of requests for connections that cannot be completed because of false return addresses. This causes connection queues to fill up, thereby denying service to legitimate users.

When a normal TCP connection begins, a destination host receives a SYN (synchronize/start) packet from a source host and sends back a SYN ACK (synchronize acknowledge) packet. The destination host must then hear an ACK (acknowledge) of the SYN ACK before the connection is established. This is referred to as the "TCP three-way handshake". While waiting for the ACK to the SYN ACK, a connection queue of finite size on the destination host keeps track of connections waiting to be completed. Normally, the queue empties quickly because the ACK usually arrives within a few milliseconds after the SYN ACK. However, when the SYN ACK is destined for a bogus host, the entry remains in the connection queue until a timer expires. The attacker exploits this feature by causing the connection queue to fill and deny TCP service to others.

Thus, the SYN flood attack is characterized by an influx of SYN packets to the same destination (host) from random source IP addresses within a short time period. Using regular expression methodology, the events SYN and ACK can be defined as a pattern that describes a set of packets. Furthermore, logical expression methodology permits the use of the counting aspects of the signature.

An event-based regular expression for a SYN flood signature might be:

For any host
    Count (SYN [~ACK] in Time) >50 FireAlarm

In other words, the number of SYN packets (but not SYN ACK packets) within a certain time period, Time, is counted. If the number exceeds 50, an alarm signal is generated. The identifiers SYN and ACK represent packet types. The identifiers Time and 50 represent signature-related events.

Another example of an intrusion signature is the SMB authorization failure signature. SMB is a message format used by DOS and Windows operating systems to share files, directories, and devices. The SMB authorization failure signature indicates an attack related to this format. An event-based regular expression for the signature might be:

For any host
    Count (SMBAuthFail) >3 FireAlarm which counts the number of SMB authorization failures. The identifier SMBAuthFail represents a packet type. The identifier 3 is a represents a signature-related event.

The above examples use various identifiers and logical symbols to illustrate the use of regular expressions and logical operators. It should be understood that any other type of "token", such as those already familiar to computer programmers, could be used. These additional tokens include a vast variety of reserved words, numerical constants, strings, and punctuation.

The use of regular expressions to represent signatures permits a compiler or other lexical analyzer to be written. In general, a process can be written for both recognizing and evaluating the above-described identifiers, special symbols, or other tokens.

Typically, lexical analysis of regular expressions representing signatures will be performed so as to provide an internal representation of the signature for processing by the sensor 11. Essentially, the processing comprises matching stored signatures to received signatures. The implementation of this matching process is often referred to as the sensor "engine". To this end, the language might be interpreted or compiled to provide a set of procedural instructions. The description might be internally represented as a decision tree, a state machine, or some other data structure. Regardless of the particular internal representation, the use of the above-described techniques to describe signatures is amenable to an analysis process that transforms the description to an executable process.

Figure 2:
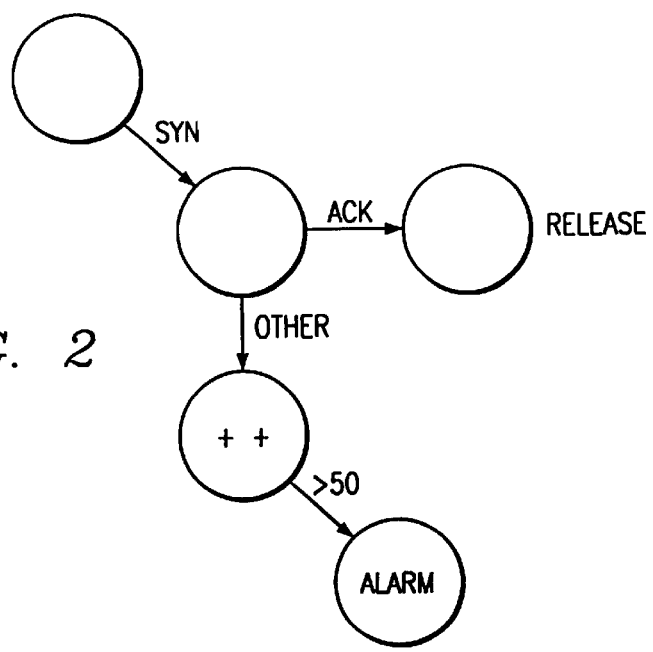
FIG. 2 illustrates a signature represented with a regular expression and expressed as a decision tree.

FIG. 2 illustrates how a regular expression for the preceding SYN ACK signature can be represented as a decision tree. If a first event, the SYN event, is detected, the process determines whether the ACK event occurs. If so, the process proceeds to a count. At any node, if the event does not occur, the process is released. If all events occur, the signature indicates a misuse.

Other Embodiments

Although the present invention has been described in detail, it should be understood that various changes, substitutions, and alterations can be made hereto without departing from the spirit and scope of the invention as defined by the appended claims.

What is claimed is:

1. An intrusion detection system comprising:
   a plurality of regular expressions embodied in a computer-readable medium describing at least one intrusion signature used in detecting intrusion to a network, the regular expressions comprising:
      a set of packet types represented by a set of regular expression identifiers; and
      logical operators describing relationships between the packet types; and
   an intrusion detection sensor operable to examine packets of data and compare the packets to the plurality of regular expressions describing intrusion signatures.

2. The system of claim 1, wherein the packet types are selected from the group consisting of TCP packets, UDP packets, and ICMP packets.

3. The system of claim 1, and wherein the intrusion detection sensor is further operable to perform each of the following functions: checksum verification, hop count checking, IP option checking, MTU checking for maximum packet size, IP fragment reassembly, TCP stream reassembly, and pattern matching.

4. The system of claim 1, wherein the at least one intrusion signature comprises a malicious intent attack signature.

5. The system of claim 1, wherein the at least one intrusion signature comprises a denial of service attack signature.

6. The system of claim 1, wherein the at least one intrusion signature comprises an invasion attempt attack signature.

7. The system of claim 1, wherein the at least one intrusion signature comprises an atomic attack signature.

8. The system of claim 1, wherein the at least one intrusion signature comprises a composite attack signature.

9. An intrusion detection system comprising:
   a plurality of regular expressions embodied in a computer-readable medium describing at least one intrusion signature used in detecting intrusion to a network, the regular expressions comprising:
      a set of packet types represented by a set of regular expression identifiers; and
      logical operators describing relationships between the packet types; and
   logic encoded in a computer-readable medium operable to examine packets of data and compare the packets to regular expressions describing intrusion signatures.

10. The system of claim 9, wherein the packet types are selected from the group consisting of TCP packets, UDP packets, and ICMP packets.

11. The system of claim 9, and wherein the logic is further operable to perform each of the following functions: checksum verification, hop count checking, IP option checking, MTU checking for maximum packet size, IP fragment reassembly, TCP stream reassembly, and pattern matching.

12. The system of claim 9, wherein the at least one intrusion signature comprises a malicious intent attack signature.

13. The system of claim 9, wherein the at least one intrusion signature comprises a denial of service attack signature.

14. The system of claim 9, wherein the at least one intrusion signature comprises an invasion attempt attack signature.

15. The system of claim 9, wherein the at least one intrusion signature comprises an atomic attack signature.

16. The system of claim 9, wherein the at least one intrusion signature comprises a composite attack signature.

17. An intrusion detection system comprising:
   a plurality of regular expressions embodied in a computer-readable medium describing at least one intrusion signature used in detecting intrusion to a network, the regular expressions comprising:
      a set of signature events represented by a set of regular expression identifiers; and
      logical operators describing relationships between the signature events; and
   an intrusion detection sensor operable to examine network traffic and compare the traffic to the regular expressions describing intrusion signatures.

18. The system of claim 17, and wherein the intrusion detection sensor is further operable to perform each of the following functions: checksum verification, hop count checking, IP option checking, MTU checking for maximum packet size, IP fragment reassembly, TCP stream reassembly, and pattern matching.

19. The system of claim 17, wherein the at least one intrusion signature comprises a malicious intent attack signature.

20. The system of claim 17, wherein the at least one intrusion signature comprises a denial of service attack signature.

21. The system of claim 17, wherein the at least one intrusion signature comprises an invasion attempt attack signature.

22. The system of claim 17, wherein the at least one intrusion signature comprises an atomic attack signature.

23. The system of claim 17, wherein the at least one intrusion signature comprises a composite attack signature.

24. An intrusion detection system comprising:
   a plurality of regular expressions embodied in a computer-readable medium describing at least one intrusion signature used in detecting intrusion to a network, the regular expressions comprising:
      a set of signature events represented by a set of regular expression identifiers; and
      logical operators describing relationships between the signature events; and
   logic encoded in a computer-readable medium operable to examine network traffic and compare the traffic to regular expressions describing intrusion signatures.

25. The system of claim 24, and wherein the intrusion detection sensor is further operable to perform each of the following functions: checksum verification, hop count checking, IP option checking, MTU checking for maximum packet size, IP fragment reassembly, TCP stream reassembly, and pattern matching.

26. The system of claim 24, wherein the at least one intrusion signature comprises a malicious intent attack signature.

27. The system of claim 24, wherein the at least one intrusion signature comprises a denial of service attack signature.

28. The system of claim 24, wherein the at least one intrusion signature comprises an invasion attempt attack signature.

29. The system of claim 24, wherein the at least one intrusion signature comprises an atomic attack signature.

30. The system of claim 24, wherein the at least one intrusion signature comprises a composite attack signature.

* * * * *